R. A. REED.
DUMPING WAGON.

No. 188,411.                               Patented March 13, 1877.

WITNESSES:
A. W. Almquist
J. H. Scarborough

INVENTOR:
R. A. Reed
BY
ATTORNEYS.

UNITED STATES PATENT OFFICE.

ROBERT A. REED, OF HOBOKEN, NEW JERSEY.

IMPROVEMENT IN DUMPING-WAGONS.

Specification forming part of Letters Patent No. 188,411, dated March 13, 1877; application filed February 10, 1877.

*To all whom it may concern:*

Figure 1:
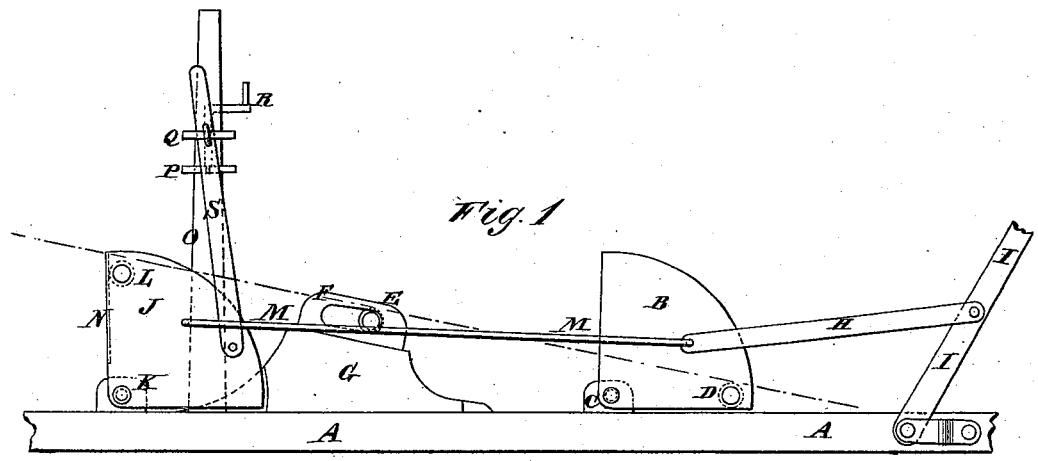
Figure 2:
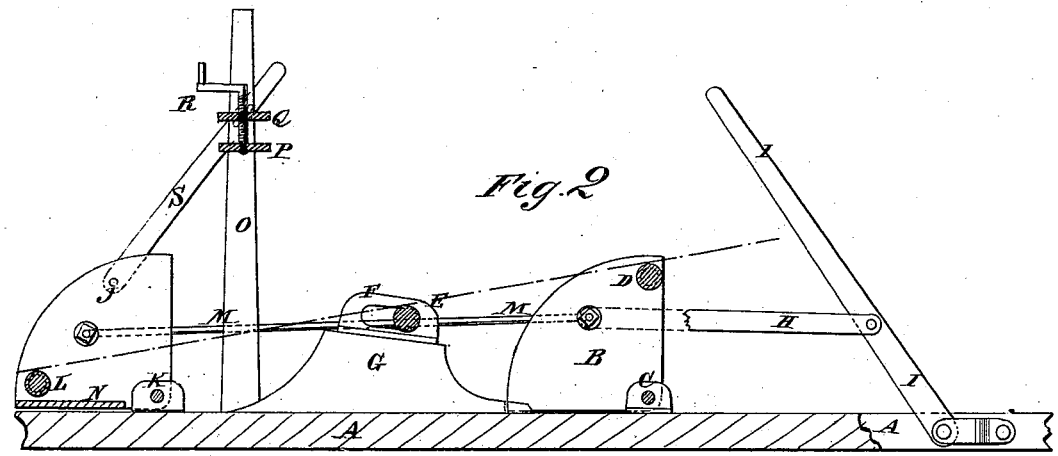
Figure 3:
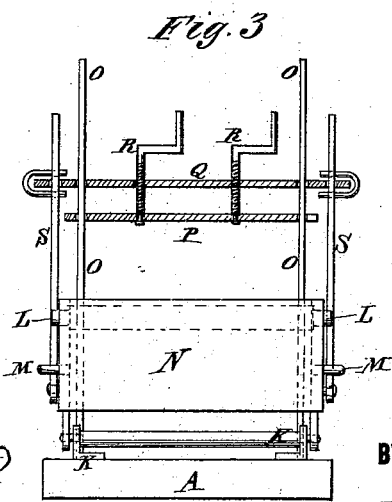

Be it known that I, ROBERT A. REED, of Hoboken, Hudson county, and State of New Jersey, have invented a new and useful Improvement in Dumping Device for Trucks, &c., of which the following is a specification:

Figure 1 is a side view of my improved device, shown as applied to the frame of a truck, and in position for carrying the load. Fig. 2 is a vertical longitudinal section of the same, shown in position for dumping the load. Fig. 3 is a rear view of the same, partly in section to show the construction.

The object of this invention is to furnish an improved device for attachment to the frames or bodies of trucks, wagons, cars, &c., to facilitate the loading and unloading of said vehicles, and which shall be simple in construction and convenient in use.

The invention consists in the combination of the pair of triangular or quadrantal plates and their shaft and roller, and the roller or rollers and its slotted and raised bearings, with the bottom or frame of a vehicle; in the combination of the second pair of triangular plates and their rod and roller with the first pair of triangular plates and their rod and roller, the roller and its slotted and raised bearings, and the bottom or frame of a vehicle; in the combination of the supporting plate or bar with either or both pairs of triangular plates and their shafts and rollers; in the combination of the connecting-rod and the lever, or equivalent device, with the forward triangular plates and their shafts and roller; in the combination of the connecting-rods, or their equivalent, with the two pairs of triangular plates and their shafts and rollers; and in the combination of the two movable cross-bars, the two swiveled crank-screws, and the two pivoted bars with the triangular plates and the upright bars or stakes attached to the bottom or frame, as hereinafter fully described.

In the drawing, A represents the bottom or frame of the vehicle, to which, in front of its center, are pivoted two metal plates, B. The disks B are made in shape of triangles or quadrants of circles, and are pivoted at their angles by a shaft, C, attached to said plates, and which works in bearings attached to the bottom or frame A. In the forward corners of the disks B are journaled the ends of a roller, D, upon which the forward part of the load rests. The middle part of the load rests upon one or more rollers, E, resting in bearings F, which may be slotted, if desired, attached to blocks G, which are attached to the bottom or frame A. The roller E serves as a pivot to the load when being tilted or dumped, and the slotted bearings F prevent the necessity of sliding the load when its forward end is raised in dumping, and thus makes the operation of dumping much easier. To the upper part of one of the plates B is pivoted the rear end of a connecting-rod, H, the forward end of which is pivoted to a lever, I. The lower end of the lever I is pivoted to the bottom or frame A, and its upper end projects into such a position that it may be conveniently reached and operated by the driver. By this construction, by operating the lever I the forward end of the load is raised, so that it will readily slide off.

If desired, the plates B may be operated by a wheel connected with them or their rod C, and operated by a chain and vertical shaft in the same manner as car-brakes are operated.

To support the rear end of the load while being carried, and give it more steadiness of motion while being tilted, a second pair of plates, J, with their shaft K and roller L, may be pivoted to the rear part of the bottom or frame A, and connected with the forward pair of plates B by connecting-rods M. In case a body or box be used, the said body or box will serve to connect the two pairs of plates B J, and the connecting-rods M will not be required. To the rear edges of the rear plates J is attached a plate, board, or bar, N, the upper edge of which projects a little above the roller L, so that when the said disks are turned forward for carrying the load the said load may rest upon the said plate or bar N, and thus relieve the journals of the roller L.

The edge of the plate or bar N may be toothed or roughened to prevent the load from slipping upon it. In the same way the journals of the roller D may be relieved, and the forward end of the load supported by a bar attached to the bottom or frame A, or to the plates B.

To the bottom or frame A, at a little distance from the pivoting-pin of the plates J, are securely attached the lower ends of two uprights or stakes, O, the upper parts of which pass through holes in the ends of the two cross-bars P Q. The lower cross-bar P is supported adjustably by two crank-screws, R, the lower ends of which are swiveled to said cross-bar. The screws R pass through screw-holes in the upper cross-bar Q. The ends of the upper cross-bar project, have holes formed through them to receive the upper parts of the bars S, and are secured to said bars S by staples or other convenient fastenings; or the bars S may be pivoted to the ends of the bars Q, if desired. The lower ends of the bars S are pivoted to the plates J.

With this construction, when the load is arranged to be carried, the swiveled crank-screws R are turned to force the lower cross-bar P down upon the load, and thus bind it in place. When the load is to be unloaded or dumped the movement of the plates J raises the bars S and the cross-bars P Q, and releases the load automatically.

Having thus described my invention, I claim as new and desire to secure by Letters Patent—

1. The combination of the pair of quadrantal plates B and their shaft C and roller D, and the roller or rollers E, having slotted and raised bearings F G, with the bottom or frame A of a vehicle, substantially as herein shown and described.

2. The combination of the second pair of plates, J, and their shaft K and roller L, with the first pair of plates, B, and their shaft C and roller D, the roller E and its slotted and raised bearings F G, and the bottom or frame A, substantially as herein shown and described.

3. The combination of the supporting plate or bar N with either or both pairs of plates J B and their shafts C K and rollers D L, substantially as herein shown and described.

4. The combination of the connecting-rod H and lever I with the forward plates B and their shaft and roller D, substantially as herein shown and described.

5. The combination of the connecting-rods M with the two pairs of plates B J and their shafts C K and rollers D L, substantially as herein shown and described.

6. The combination of the movable cross-bars P Q, the swiveled crank-screws R, and the pivoted bars S with the plates J and the upright bars or stakes O, attached to the bottom or frame A, substantially as herein shown and described.

ROBERT A. REED.

Witnesses:
JAMES T. GRAHAM,
C. SEDGWICK.